(12) United States Patent
Nakamura

(10) Patent No.: US 8,446,625 B2
(45) Date of Patent: May 21, 2013

(54) POWER OVERLOAD-PREVENTING PRINTING APPARATUS, PRINTING CONTROL APPARATUS, AND PRINTING SYSTEM

(75) Inventor: Noriaki Nakamura, Tokyo (JP)

(73) Assignee: Oki Data Corporation, Tokyo (JP)

( * ) Notice: Subject to any disclaimer, the term of this patent is extended or adjusted under 35 U.S.C. 154(b) by 380 days.

(21) Appl. No.: 12/844,375

(22) Filed: Jul. 27, 2010

(65) Prior Publication Data

US 2011/0019234 A1 Jan. 27, 2011

(30) Foreign Application Priority Data

Jul. 27, 2009 (JP) ................................. 2009-173802

(51) Int. Cl.
*G06F 3/12* (2006.01)

(52) U.S. Cl.
USPC ........ 358/1.15; 358/1.14; 358/1.13; 700/291; 700/293; 700/297; 700/295; 700/286; 347/171

(58) Field of Classification Search
USPC ............... 358/1.15, 1.14, 1.13; 700/286, 293, 700/295, 297, 291; 347/171
See application file for complete search history.

(56) References Cited

U.S. PATENT DOCUMENTS

| | | | | |
|---|---|---|---|---|
| 6,018,690 A | * | 1/2000 | Saito et al. | 700/295 |
| 6,347,202 B1 | * | 2/2002 | Shishizuka et al. | 399/75 |
| 2002/0140964 A1 | * | 10/2002 | Goto et al. | 358/1.14 |
| 2005/0275868 A1 | * | 12/2005 | Higashiura et al. | 358/1.14 |

FOREIGN PATENT DOCUMENTS

| | | |
|---|---|---|
| JP | 02-123921 A | 5/1990 |
| JP | 2008-146465 A | 6/2008 |
| JP | 2008-167544 A | 7/2008 |
| JP | 2008-167545 A | 7/2008 |

* cited by examiner

*Primary Examiner* — Jacky X Zheng
(74) *Attorney, Agent, or Firm* — Marvin A. Motsenbocker; Mots Law, PLLC

(57) ABSTRACT

A printing apparatus comprises: a storage unit configured to store a power usage of each of one or more other printing apparatuses connected to a power supply system to which the printing apparatus is connected; and a print execution controller. The print execution controller is configured to: keep track of which of the other printing apparatuses are in printing operation; calculate, upon receipt of a print instruction from any of the external apparatuses, a total of power usages of the other printing apparatuses that are in printing operations; inhibit the printing apparatus from printing when an expected power exceeds a predetermined allowable value, the expected power is a sum of the calculated total of power usages and the power usage of the printing apparatus during the printing operation; and allow the printing apparatus to print when the expected power is equal to or below the predetermined allowable value.

16 Claims, 14 Drawing Sheets

FIG. 7

522a APPARATUS INFORMATION TABLE

| PRINTER NAME | IP ADDRESS | POWER USAGE |
|---|---|---|
| PRINTING APPARATUS 4 | XXX. XXX. XXX. XXX | XX W |
| PRINTING APPARATUS 6 | XXX. XXX. XXX. XXX | XX W |
| ⋮ | ⋮ | ⋮ |

FIG. 8

523a PRINT WAITING LIST

| PRINTER NAME | IP ADDRESS | PRIORITY |
|---|---|---|
| PRINTING APPARATUS 4 | XXX. XXX. XXX. XXX | 1 |
| PRINTING APPARATUS 5 | XXX. XXX. XXX. XXX | 2 |

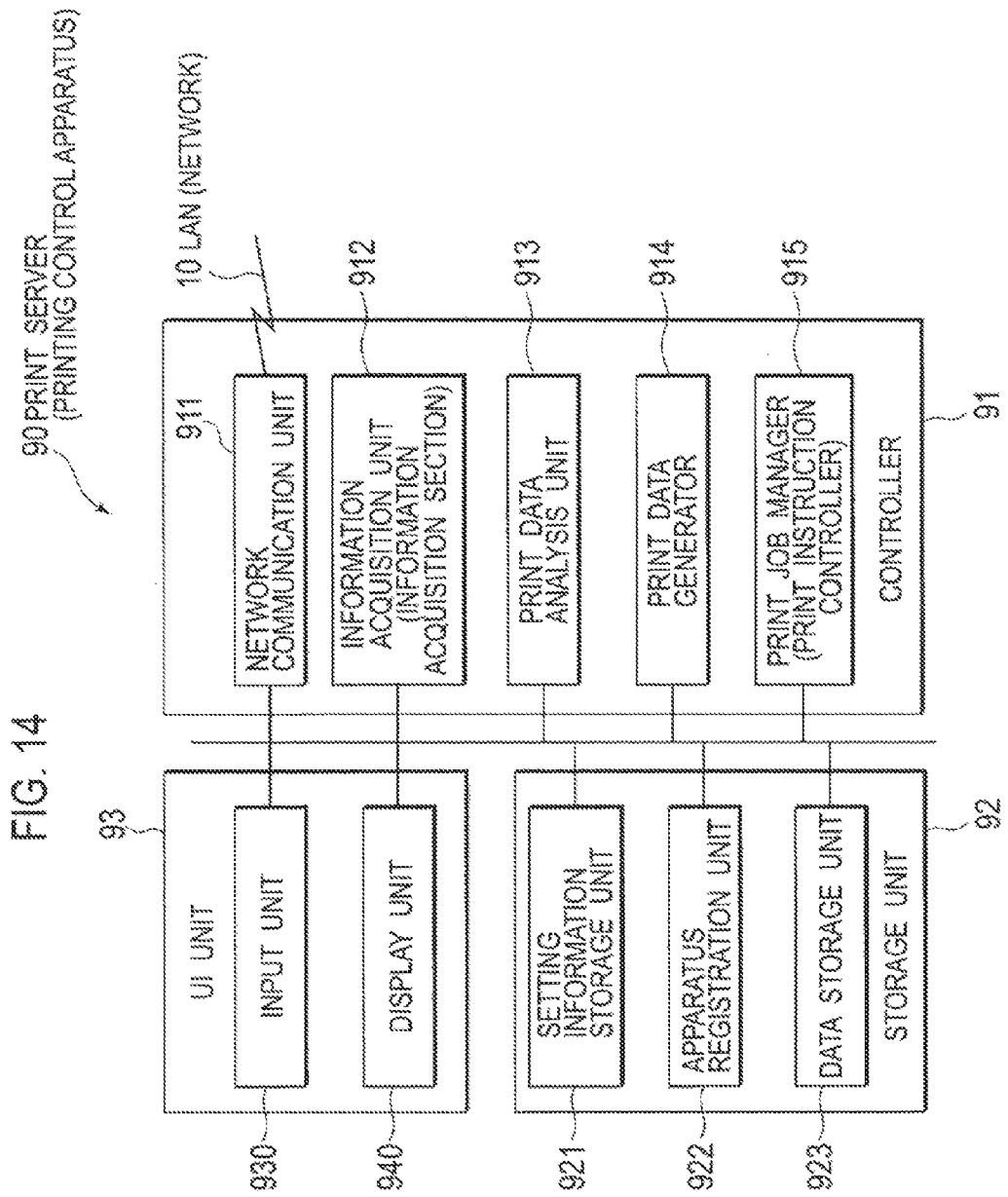

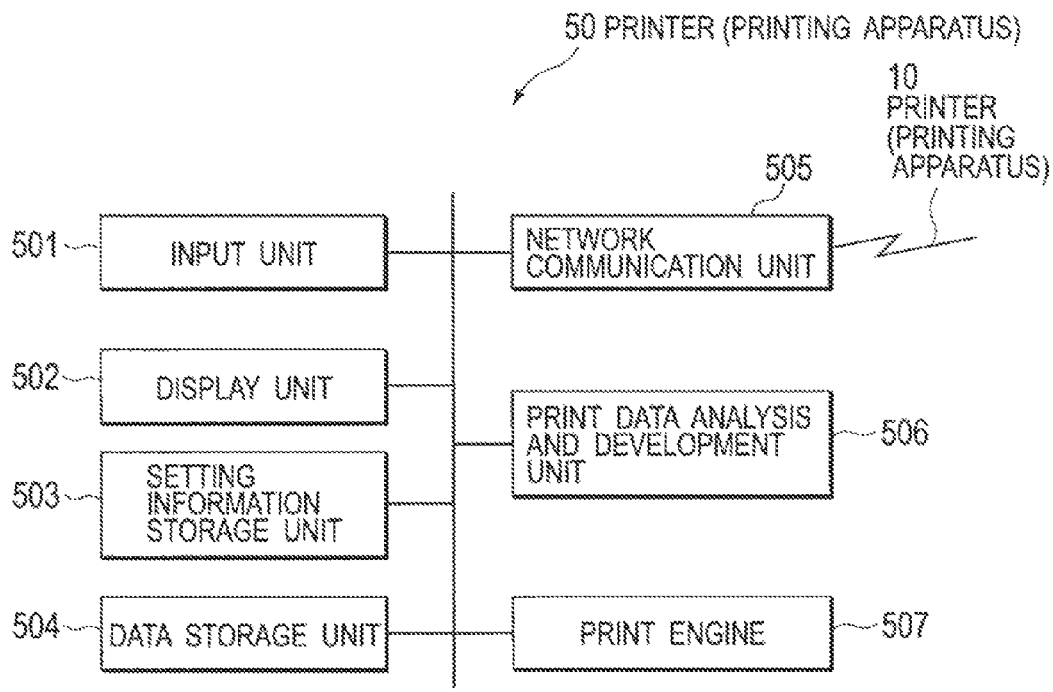

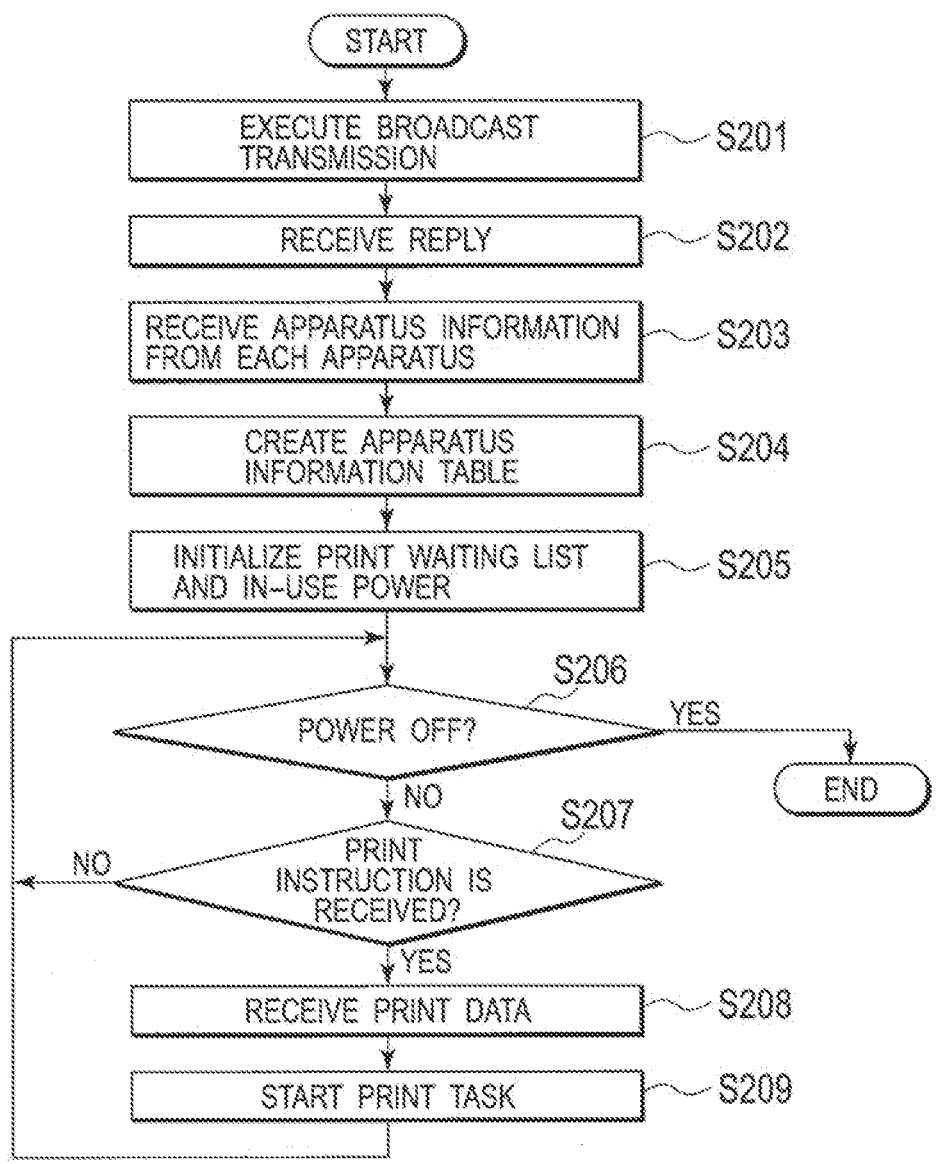

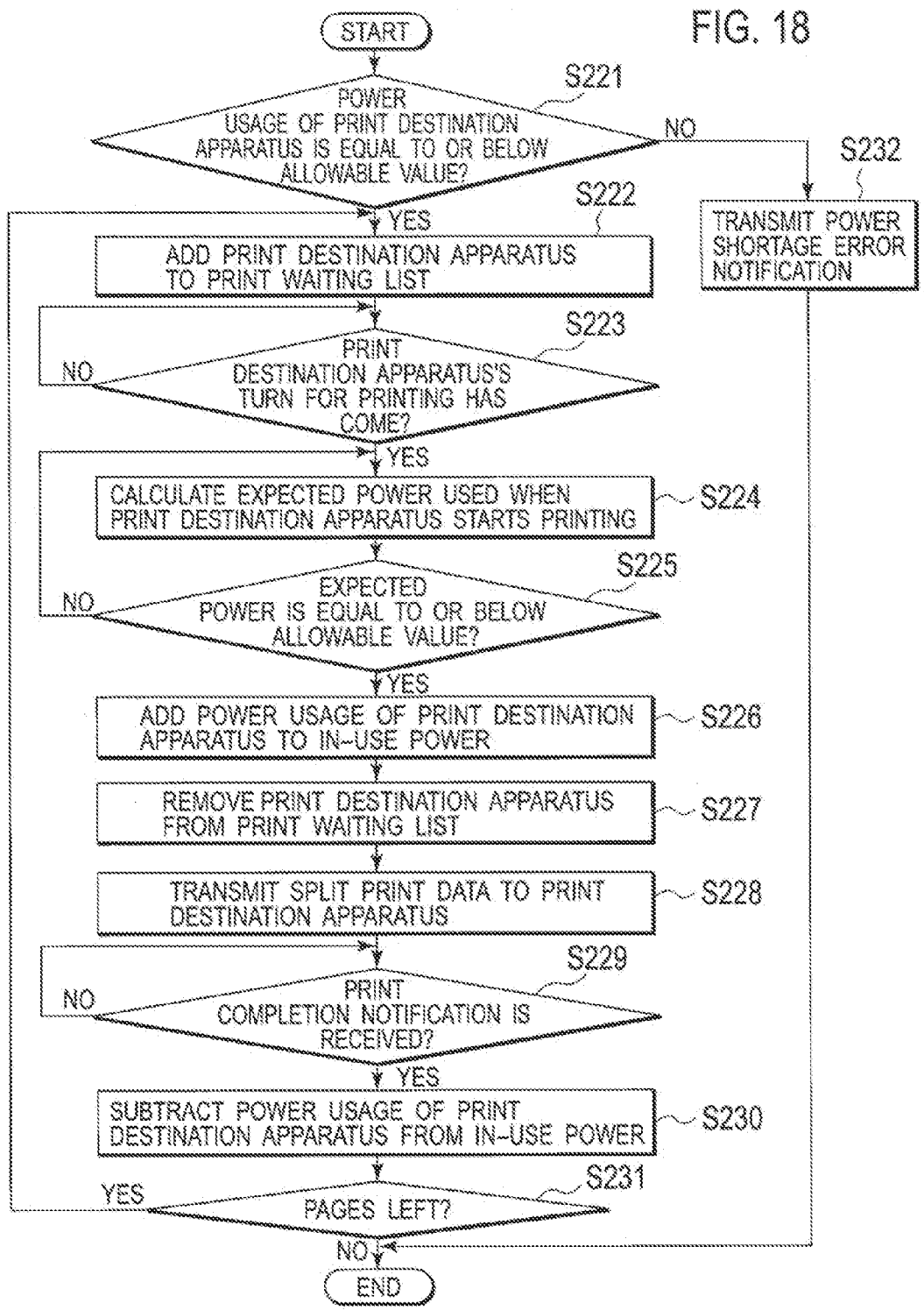

POWER OVERLOAD-PREVENTING PRINTING APPARATUS, PRINTING CONTROL APPARATUS, AND PRINTING SYSTEM

CROSS REFERENCE TO RELATED APPLICATIONS

This application claims priority based on 35 USC 119 from prior Japanese Patent Application No. P2009-173802 filed on Jul. 27, 2009, entitled "PRINTING APPARATUS, PRINTING CONTROL APPARATUS, AND PRINTING SYSTEM", the entire contents of which are incorporated herein by reference.

BACKGROUND OF THE INVENTION

1. Field of the Invention

The invention relates to a printing apparatus (printer, copier, facsimile machine, multifunction printer, etc.), a printing control apparatus, and a printing system which are connected to a network. More particularly, the invention relates to a technique to limit power usage during a printing operation of the printing apparatus.

2. Description of the Related Art

There has been known a printing system in which one or more external apparatuses, such as Personal Computers (PCs), and one or more printing apparatuses are connected to a network such as a Local Area Network (LAN), and in which the printing apparatuses execute printing independently of each other. In this printing system, each of the printing apparatuses starts a printing operation immediately after receiving a print instruction from any of the external apparatuses.

As disclosed in Japanese Patent Application Publication No. 2008-146465 (Paragraph [0006], FIG. 1), there has also been known a printing control apparatus (print server) which selects a printing apparatus suitable for print data transmitted from an external apparatus from among multiple printing apparatuses on a network, and then causes the selected printing apparatus to execute printing.

SUMMARY OF THE INVENTION

However, when multiple printing apparatuses connected to a network are all supplied with power from one power supply system, the total power consumption by the printing apparatuses in some situations exceeds the maximum allowable power of the power supply system depending on the number of printing apparatuses which perform printing operations simultaneously. As a result, a breaker trips and all the external apparatuses and printing apparatuses connected to the power supply system cease to function. This causes problems in that not only the data that is being printed (or processed) may be lost but also the apparatuses may malfunction.

It is an object of an aspect of the invention to provide a printing apparatus, a printing control apparatus and a printing system, which enable execution of printing operations while limiting the total power consumption of the multiple printing apparatuses all supplied with power from the same power supply system to a predetermined value or less even when print instructions are transmitted simultaneously to the printing apparatuses.

A first aspect of the invention is a printing apparatus to be connected to a network, the printing apparatus configured to print data in accordance with a print instruction from one or more external apparatuses. The printing apparatus comprises a storage unit configured to store the value of the power consumption of each of the other printing apparatuses during a printing operation, the other printing apparatuses being connected to the same power supply system to which the printing apparatus is connected; and a print execution controller. The print execution controller is configured to: keep track of which of the printing apparatuses are in printing operation by receiving messages indicating start and end of the printing operation from the other printing apparatuses; obtain the total power consumption of the other printing apparatuses by referring to the power consumption values stored in the storage unit upon receipt of a print instruction from any of the external apparatuses; inhibit the printing apparatus from executing the printing operation when an expected power exceeds a predetermined allowable value, the expected power being obtained as the sum of the calculated total power consumption and the power consumption of the printing apparatus during the printing operation; and allow the printing apparatus to execute the printing operation when the expected power is equal to or below the predetermined allowable value.

A second aspect of the invention is a printing control apparatus connected to a network, the printing control apparatus configured, in accordance with a print instruction from external apparatuses, to transmit print data to one of printing apparatuses belonging to the same power supply system in order to cause the one of the printing apparatuses to print the print data. The printing control apparatus comprises: a storage unit configured to store the value of the power consumption of each of the printing apparatuses during a printing operation; and a print instruction controller configured to, upon receipt of the print instruction to any one of the printing apparatuses, adjust the timing of transmitting the print data to the printing apparatus by referring to the power consumption values stored in the storage unit so that the total power consumption of the printing apparatuses expected to be concurrently in printing operation does not exceed a predetermined allowable value.

A third aspect of the invention is a print management method used for a print system wherein printing apparatus are connected to a host apparatus via a network, comprising steps of: calculating a sum of power usages of the printing apparatuses that are expected to be concurrently in printing operations; and regulating the printing operation of at least one of the printing apparatus when the calculated sum exceeds a predetermined allowable value.

According to the above aspects, printing operations can be executed while limiting the total power consumption of the multiple printing apparatuses all supplied with power from the same power supply system to a predetermined value or less even when print instructions are transmitted simultaneously to the printing apparatuses.

BRIEF DESCRIPTION OF THE DRAWINGS

FIG. 7 is a diagram illustrating an example of a data structure of an apparatus information table stored in an apparatus registration unit.

FIG. 8 is a diagram illustrating an example of a data structure of a print waiting list stored in a data storage unit of the printing apparatus.

FIG. 14 is a functional block diagram illustrating a configuration example of a print server (printing control apparatus).

FIG. 15 is a functional block diagram illustrating a configuration example of a printer (printing apparatus) without a power limiting function.

FIG. 16 is a diagram illustrating an example of a data structure of a print waiting list stored in a data storage unit of the print server (printing control apparatus).

FIG. 17 is a flowchart illustrating processing during a print time sharing operation performed by the print server (printing control apparatus).

FIG. 18 is a flowchart illustrating details of processing of a print task.

DETAILED DESCRIPTION OF EMBODIMENTS

Figure 1:
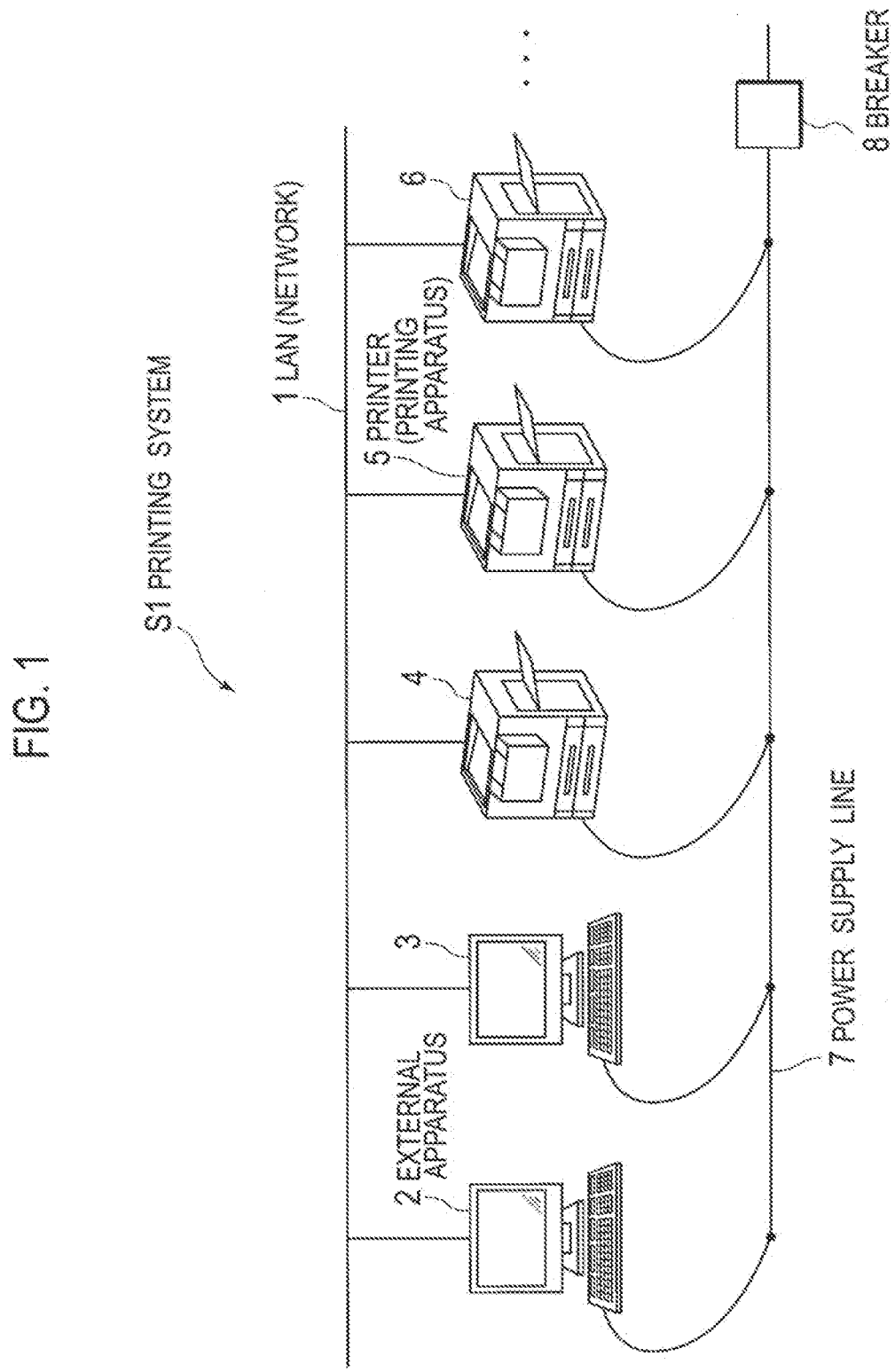
FIG. 1 is a connection configuration diagram illustrating an example of a printing system according to a first embodiment.

Descriptions are provided herein below for embodiments based on the drawings. In the respective drawings referenced herein, the same constituents are designated by the same reference numerals and duplicate explanation concerning the same constituents is omitted. All of the drawings are provided to illustrate the respective examples only.

Two embodiments (first embodiment and second embodiment) for carrying out the invention are described in detail below.

First Embodiment

In the first embodiment, a printing system including printing apparatuses of the invention each with a power limiting function is described.

FIG. 1 is a connection configuration diagram illustrating an example of the printing system according to the first embodiment. As shown in FIG. 1, printing system S1 is configured such that one or more external apparatuses 2 and 3 and one or more printers 4 to 6 as printing apparatuses of the invention each with a power limiting function are all connected to LAN 1 being one network, and also to power supply line 7 being one power supply system.

External apparatuses 2 and 3 are, for example, PCs each having installed therein software for creating documents and a printer driver configured to instruct printing of created documents. Meanwhile, each of printers 4 to 6 receive print data of the created documents and print the received data on a medium such as paper in accordance with print instructions transmitted from the printer drivers of external apparatuses 2 and 3 over LAN 1. Note that the number of external apparatuses 2 and 3 and printers 4 to 6 connected to LAN 1 varies depending on the size of the office in which the printing system is installed.

Power supply line 7 is connected to a commercial power supply (not shown) sourced through breaker 8. Breaker 8 is a safety device for interrupting the connection between power supply line 7 and the commercial power supply when a current exceeding a predetermined value has continuously flowed through power supply line 7 for over a given period of time. Therefore, printing system S1 must execute printing operations while limiting the total power consumption of printers 4 to 6 so that the power supplied through line 7 is not interrupted by tripping of breaker 8.

A laser printer or a Light Emitting Diode (LED) printer widely used in offices and the like consumes a relatively large amount of power during a printing operation, which may be hundreds of watts to one kilowatt. However, in quite a few offices, a number of PCs and several printers are connected to one power supply system having installed therein a breaker having a rated current of about 15 to 30 amperes. In such an environment, there is a risk that the breaker trips when just two or three printers start their printing operations simultaneously. In printing system S1, each of printers 4 to 6 is provided with a function to detect the operating condition of the other printers by communicating therewith over LAN 1 and to adjust the timing of printing operation with the other printers. Thus, printing system S1 keeps the total power consumption of all the printers within a predetermined value at which breaker 8 does not trip.

Figure 2:
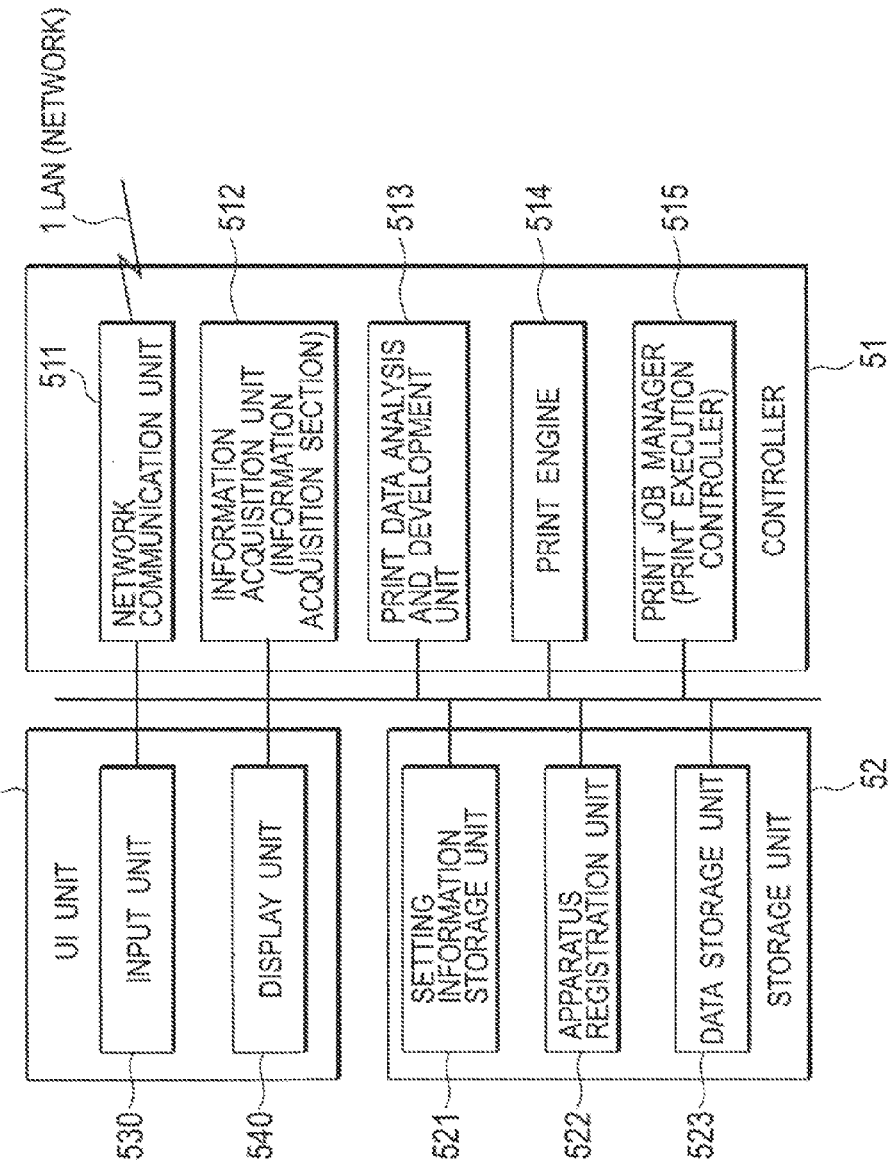
FIG. 2 is a functional block diagram illustrating a configuration example of a printer (printing apparatus) with a power limiting function.

FIG. 2 is a functional block diagram illustrating a configuration example of printer 5 being the printing apparatus of the invention with a power limiting function. Although only printer 5 is described below, printers 4 and 6 also have the same configuration.

As shown in FIG. 2, printer 5 includes controller 51, storage unit 52 and user interface unit (hereinafter abbreviated as UI unit) 53.

Controller 51 includes network communication unit 511, information acquisition unit 512, print data analysis and development unit 513, print engine 514, and print job manager 515. These functions are implemented by causing an unillustrated Central Processing Unit (CPU) included in printer 5 to load a predetermined program stored in an unillustrated Read Only Memory (ROM), hard disk drive or the like into an unillustrated Random Access Memory (RAM) and to execute the loaded program.

Network communication unit 511 has a function of communicating with external apparatuses 2 and 3 and other printers 4 and 6 via LAN 1. Network communication unit 511 receives print data transmitted from external apparatuses 2 and 3 and stores the received print data in data storage unit 523. Network communication unit 511 also transmits and receives various messages to and from other printers 4 and 6 in accordance with instructions from information acquisition unit 512 and print job manager 515. For transmission and reception of the messages and data, Transmission Control Protocol/Internet Protocol (TCP/IP) is used, for example.

Information acquisition unit 512 as an information acquisition section has a function of acquiring various types of information required for a power limiting operation, from UI unit 53 and also from other printers 4 and 6 through network communication unit 511. Information acquisition unit 512 also has a function of storing the acquired information in setting information storage unit 521, apparatus registration unit 522, and data storage unit 523.

Print data analysis and development unit 513 has a function of analyzing the print data stored in data storage unit 523 in accordance with an instruction from print job manager 515, counting the number of sheets to be printed, and handing over to print engine 514 the print data corresponding to a single unit of the specified number of sheets.

Print engine 514 has a function of developing the print data handed over from print data analysis and development unit 513 into data in units of pixel ( ), which is data in minimum printable units, and then printing the developed pixel data on a print medium such as a paper sheet.

Print job manager 515 as a print execution controller has a function of estimating a total power consumption of other printers 4 and 6 and a power consumption required for a printing operation of printer 5 upon receipt of print instructions from external apparatuses 2 and 3. Print job manager 515 also has a function of controlling the timing of printing operation of printer 5 so that the estimated value does not exceed maximum usable power that is an allowable value based on the rated current of breaker 8. This print timing control function is hereinafter called "print time sharing" for convenience in terms of the operation mode.

Storage unit 52 includes, for example, nonvolatile and volatile semiconductor memories. The nonvolatile semiconductor memory includes setting information storage unit 521 and apparatus registration unit 522. Setting information storage unit 521 stores data set and input by a user, such as whether or not a print time sharing operation is required, the specified number of sheets, and the maximum usable power. Meanwhile, apparatus registration unit 522 stores data acquired by information acquisition unit 512, such as printer names, Internet Protocol (IP) addresses and power consumption (during printing operations) of other printers 4 and 6. Moreover, data storage unit 523 included in the volatile semiconductor memory stores information such as the print data received by network communication unit 511 and a print waiting list required for control of the print time sharing operation. Note that an example of a data structure of the data stored in apparatus registration unit 522 is described later with reference to FIG. 7. Similarly, an example of a data structure of the print waiting list stored in data storage unit 523 is described later with reference to FIG. 8.

UI unit 53 includes, for example: input unit 530 including key switches mounted on an operation panel provided in an upper part of the case of printer 5; and display unit 540 such as a Liquid Crystal Display (LCD) device.

UI unit 53 functions as a user interface unit for inputting first setting information indicating whether or not the print time sharing operation is required. Information acquisition unit 512 stores the first setting information set and input by the user in setting information storage unit 521. Moreover, when the first setting information is set to "ON", i.e. that the print time sharing operation is required, print job manager 515 controls the timing for printer 5 to execute the printing operation so that the total power consumption of other printers 4 and 6 and the power usage required for the printing operation of printer 5 does not exceed the maximum usable power registered in setting information storage unit 521.

UI unit 53 also functions as a user interface unit for inputting second setting information indicating the specified number of sheets, which serves as a unit in processing of the printing operation. Information acquisition unit 512 stores the second setting information set and input by the user in setting information storage unit 521. Moreover, for example, when multiple print instructions are transmitted to multiple printers 4 to 6 during the print time sharing operation but printing operations at printers 4 to 6 cannot be executed all at once due to the power usage limit, print job manager 515 sequentially performs printing operations within the limitation of the maximum usable power while using the specified number of sheets as a unit. In this event, for example, printer 5 suspends printing once after printing for the specified number of sheets is finished, enters a print wait state, and causes another printer (printer 4 or 6) in a print wait state to execute printing. Thus, upon receipt of the print instruction, each of printers 4 to 6 divides the print data into units of the specified number of sheets and sequentially prints the divided print data, thereby executing the print time sharing operation without causing breaker 8 to trip.

UI unit 53 further functions as a user interface unit for inputting third setting information indicating the maximum usable power. Information acquisition unit 512 stores the third setting information set and input by the user in setting information storage unit 521. Moreover, during the print time sharing operation, print job manager 515 prevents printer 5 from executing the printing operation or causes printer 5 to execute the printing operation on the basis of the maximum usable power. Note that when there are other apparatuses which receive power from the same power supply line 7 as printers 4 to 6, it is preferable that the maximum usable power is determined by taking into consideration the rated current of breaker 8 and the total power consumption of the other apparatuses.

Figure 3:
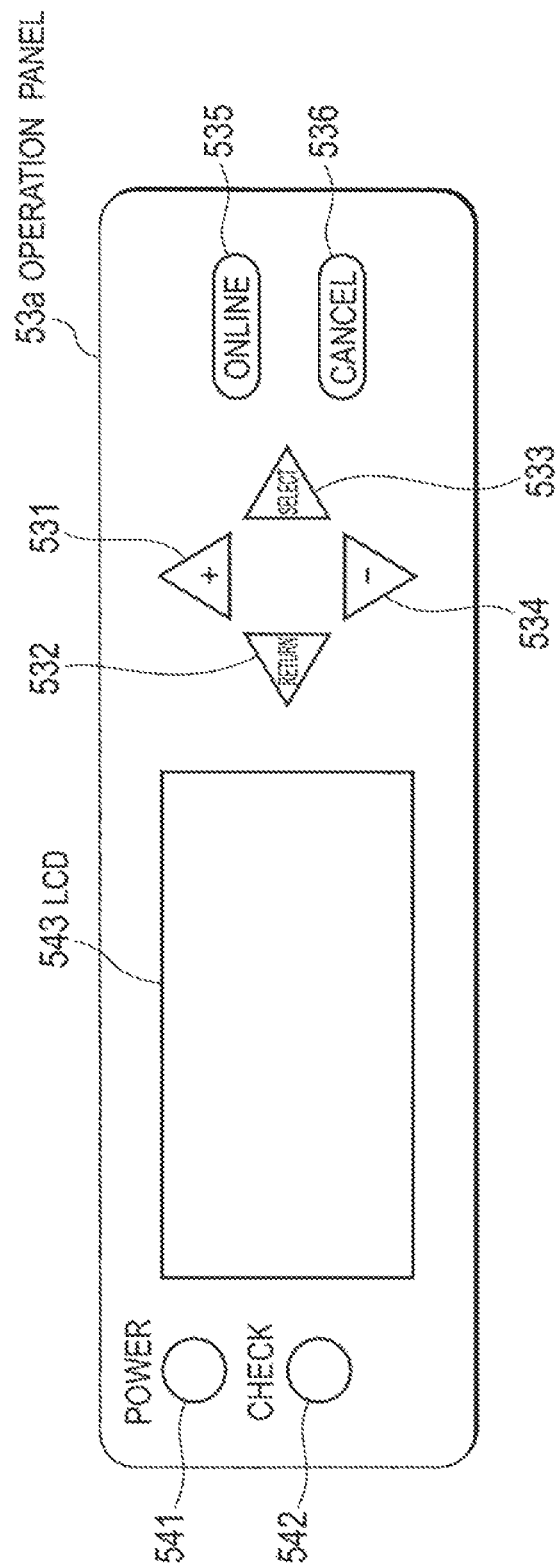
FIG. 3 is an exterior appearance of an example of an operation panel included in the printing apparatus.

FIG. 3 is a diagram illustrating an example of the operation panel provided in printer 5 as UI unit 53. As shown in FIG. 3, operation panel 53a includes, as input unit 530, online key 535 and cancel key 536 in addition to four keys used for menu operation, namely "+" key 531, return key 532, select key 533, and "−" key 534. Operation panel 53a also includes, as display unit 540, power lamp 541, check lamp 542, and LCD 543.

Power lamp 541 is turned on when printer 5 is in a power ON state, and is turned off when printer 5 is in a power OFF state. Check lamp 542 is turned on in the event of some kind of failure in printer 5. Here, the failure means, for example, situations that pose a problem for the printing operation, such as where there is no paper or toner, a cover is opened, or a paper jam has occurred. LCD 543 is a liquid crystal display device which displays input information, various setting values, apparatus state and the like of printer 5 with character strings, graphics and the like.

When the user presses "+" key 531 in the power ON state of printer 5, LCD 543 displays a first item in the menu. When the user further presses "+" key 531 after the menu is displayed, LCD 543 sequentially displays the following items. In other words, each pressing of "+" key 531 shifts the display to the next item. The item is selected by pressing select key 533, and then details of the item or a menu item therebelow is displayed on LCD 543.

When the details of the item are displayed on LCD 543, setting values can be selected or can be incremented or decremented by pressing "+" key 531 or "−" key 534. The setting value is entered by pressing select key 533.

Return key 532 is a key switch to be pressed for returning to one higher category in the menu. When return key 532 is continuously pressed, the display eventually returns to a standby screen. When "−" key 534 is pressed in the power ON state, the display of LCD 543 shifts to the menu display, and the first item in the menu is displayed as in the case of "+" key 531. When "−" key 534 is further pressed, the menu display proceeds in the order opposite to the case of "+" key 531. Such display control of the menu and setting screens is performed by information acquisition unit 512.

Meanwhile, online key 535 is a key switch for switching printer 5 from an online state to an offline state or from the offline state to the online state. Cancel key 536 is a key switch for canceling printing. When cancel key 536 is pressed during reception of print data, the print data is deleted upon completion of the reception of the print data. When cancel key 536 is pressed during printing, pages of a document after the one that is being printed are not printed.

Figure 4:
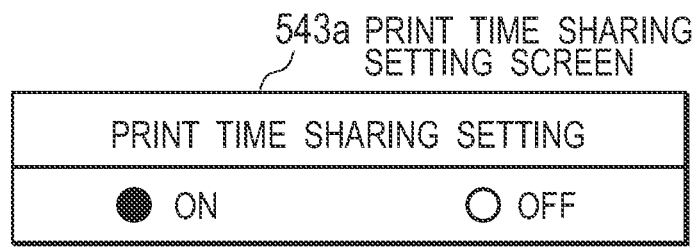
FIG. 4 is a diagram illustrating a display example of a "print time sharing setting screen".

FIG. 4 is a diagram illustrating a display example of "print time sharing setting screen" displayed on LCD 543 of operation panel 53a. After performing the menu operation described above to display print time sharing setting screen 543a as shown in FIG. 4 on LCD 543, the user switches print time sharing setting to ON or OFF by pressing "+" key 531 or "−" key 534. Then, the user fixes the setting by pressing select key 533. The print time sharing setting value (first setting information) thus set by the user is handed over to information acquisition unit 512 and then stored in setting information storage unit 521.

Figure 5:
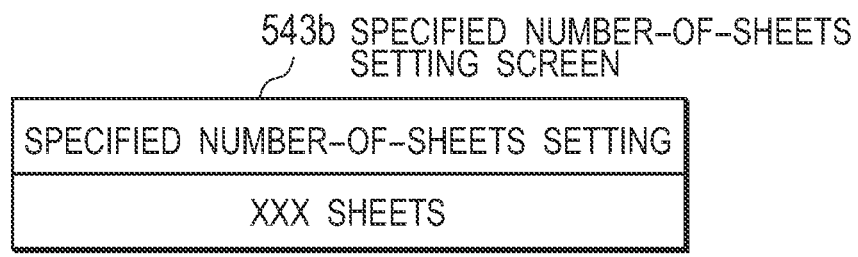
FIG. 5 is a diagram illustrating a display example of a "specified number-of-sheets setting screen".

FIG. 5 is a diagram illustrating a display example of "specified number-of-sheets setting screen" displayed on LCD 543 of operation panel 53a. After performing the menu operation described above to display specified number-of-sheets setting screen 543b as shown in FIG. 5 on LCD 543, the user increments or decrements a value of the specified number of sheets by pressing "+" key 531 or "−" key 534 to set the value to a given value. Then, the user fixes the value by pressing select key 533. The value of the specified number of sheets (second setting information) thus set by the user is handed over to information acquisition unit 512 and then stored in setting information storage unit 521.

Figure 6:
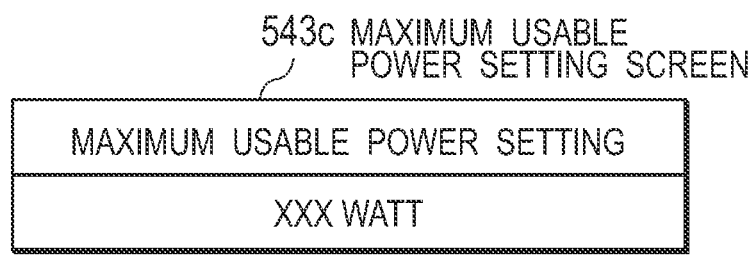
FIG. 6 is a diagram illustrating a display example of a "maximum usable power setting screen".

FIG. 6 is a diagram illustrating a display example of "maximum usable power setting screen" displayed on LCD 543 of operation panel 53a. After performing the menu operation described above to display maximum usable power setting screen 543c as shown in FIG. 6 on LCD 543, the user sets the value of the maximum usable power (wattage) by using "+" key 531 and "−" key 534. Then, the user fixes the value by pressing select key 533. The value of the maximum usable power (third setting information) thus set by the user is similarly stored in setting information storage unit 521.

FIG. 7 is a diagram illustrating an example of a data structure of an apparatus information table stored in apparatus registration unit 522 of storage unit 52. As shown in FIG. 7, apparatus information table 522a stores data such as a printer name, an IP address and a power consumption (during printing operation) of each of all the other printers 4, 6, . . . , which are connected to LAN 1 and supplied with power from the same power supply line 7 as printer 5. These data are acquired from printers 4, 6, . . . through LAN 1 by information acquisition unit 512 at start-up of printer 5.

FIG. 8 is a diagram illustrating an example of a data structure of a print waiting list stored in data storage unit 523 of storage unit 52. As shown in FIG. 8, print waiting list 523a stores printer names, IP addresses and priorities of printers (in this example, printers 4 and 5) which are in a print wait state and have data for which printing is not completed (unprinted data). Here, the printers are ones out of all printers 4, 5, 6, . . . including printer 5, which are connected to LAN 1 and supplied with power from the same power supply line 7 as printer 5. Note that the printing is performed sequentially from the printer (in this example, printing apparatus 4) having the priority of "1". When the printing of such printer is started, the printer is removed from print waiting list 523a and the priorities of the remaining printers are moved forward by 1, respectively. Moreover, the printer that has received a new print instruction is given a priority following that of the last printer and is added at the bottom of print waiting list 523a.

Figure 9:
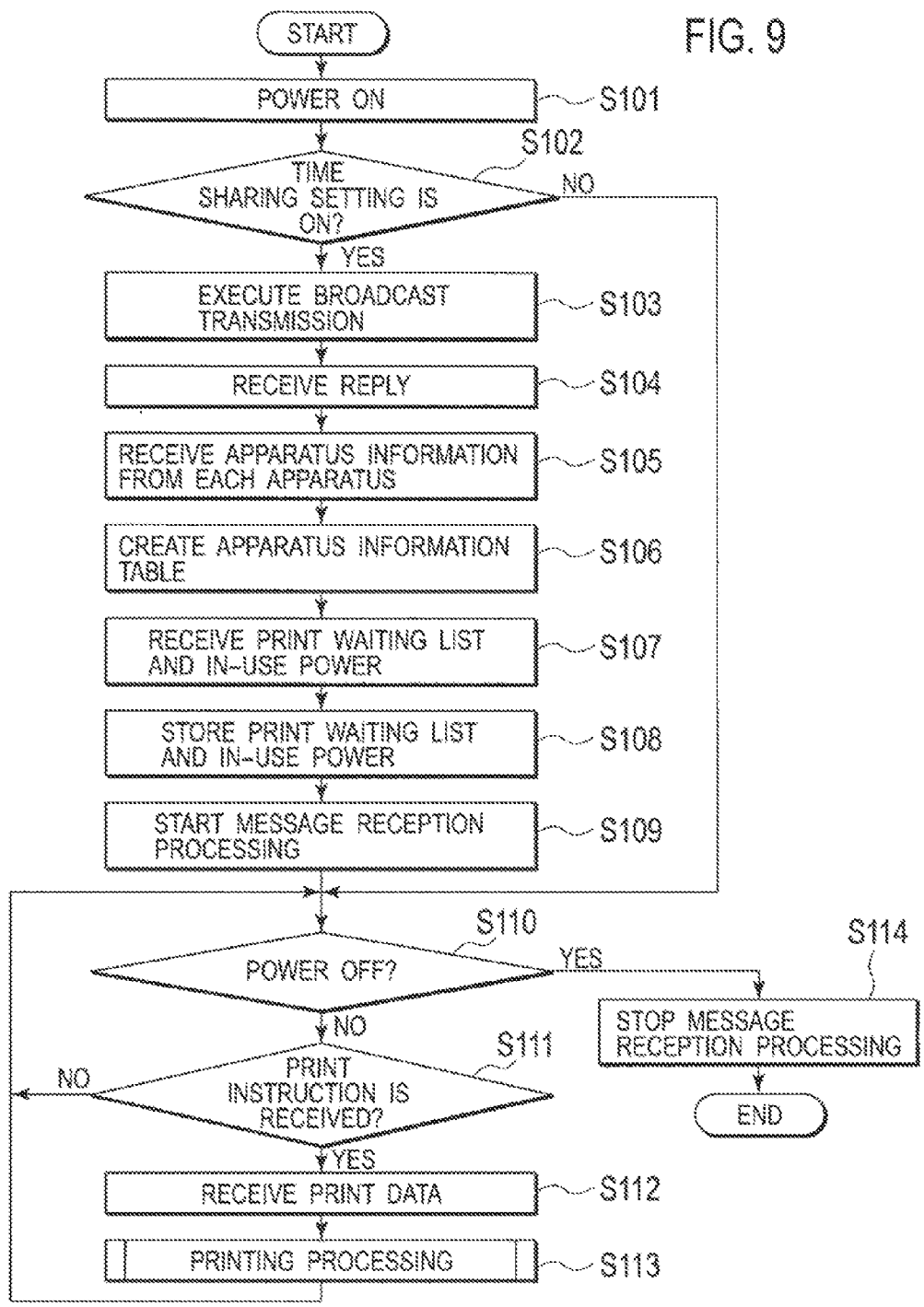
FIG. 9 is a flowchart illustrating basic operations of the printing apparatus with the power limiting function.
Figure 10:
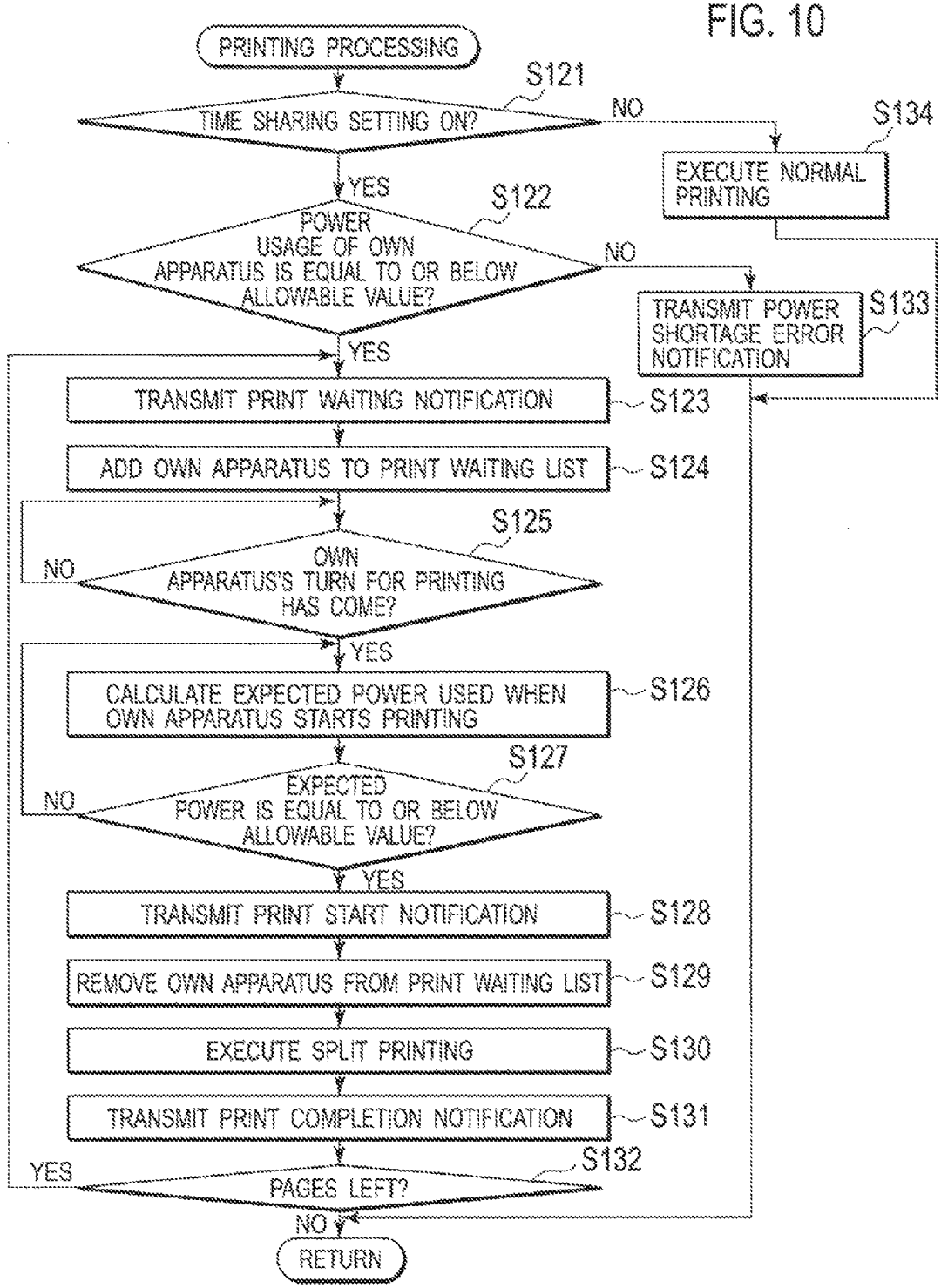
FIG. 10 is a flowchart illustrating details of processing of a printing processing subroutine.
Figure 11:
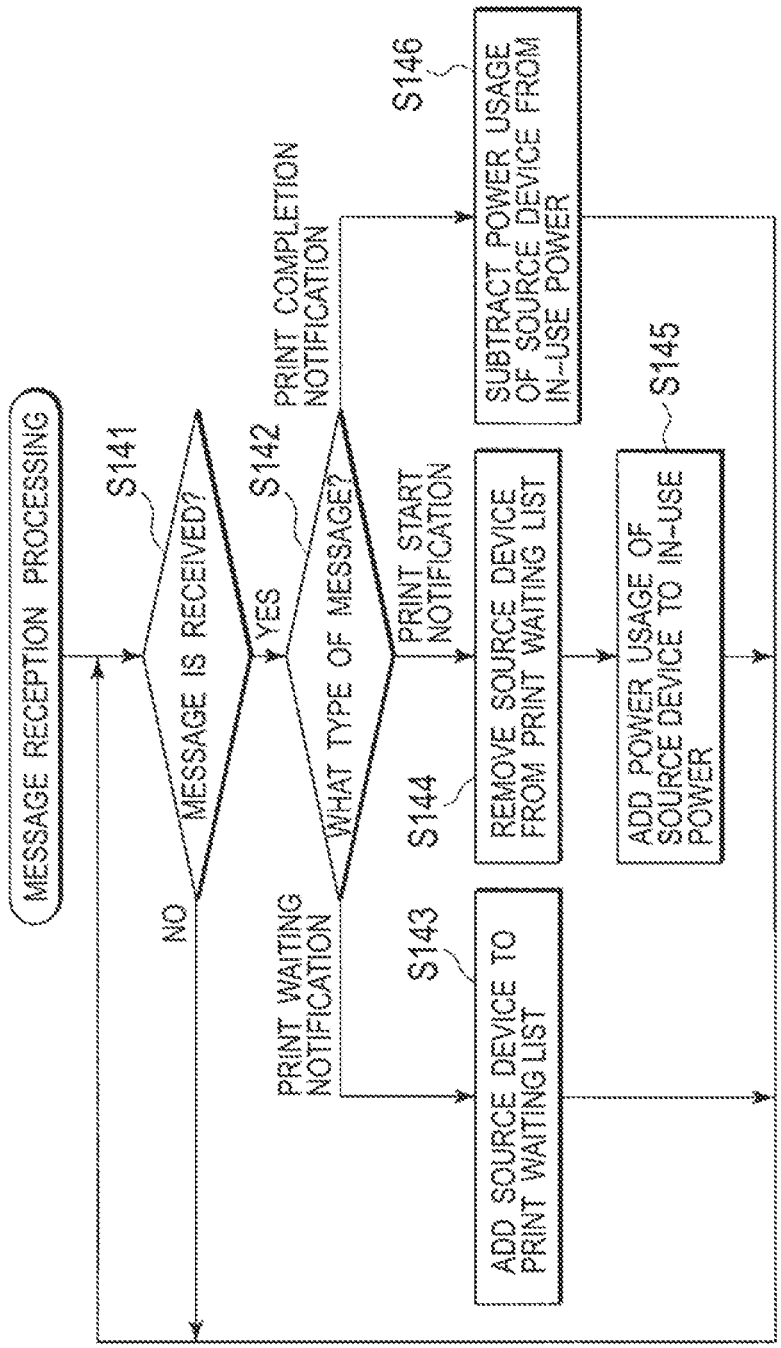
FIG. 11 is a flowchart illustrating details of message reception processing.

Next, with reference to flowcharts shown in FIGS. 9 to 11, detailed descriptions are given of operations of the printing apparatuses included in printing system S1 according to the first embodiment by taking printer 5 as an example. Note that it is assumed that the first to third setting information set and input using UI unit 53 has already been stored in setting information storage unit 521.

FIG. 9 is a flowchart illustrating basic operations of the printing apparatus included in printing system S1 according to the first embodiment. In FIG. 9, processing from Step S101 to Step S109 is executed when the printing apparatus is turned on. For example, when printer 5 is turned on by the user (Step S101), information acquisition unit 512 first reads the value of the print time sharing setting (hereinafter abbreviated as "time sharing setting") stored in setting information storage unit 521 and judges whether or not the value is ON (Step S102). Here, when the time sharing setting is not ON ("No" in Step S102), information acquisition unit 512 advances the processing to Step S110 to be described later.

On the other hand, when the time sharing setting is ON ("Yes" in Step S102), information acquisition unit 512 acquires information on the other printers connected to LAN 1 by executing processing from Step S103 to Step S106.

Specifically, information acquisition unit 512 causes network communication unit 511 to execute broadcast transmission in which a broadcast signal is transmitted to LAN 1 (Step S103) and to receive IP addresses transmitted in response from the other printers (Step S104). Thereafter, information acquisition unit 512 causes network communication unit 511 to transmit a message requesting apparatus information to printers 4 and 6, which have transmitted the IP addresses in response, and then to receive the apparatus information transmitted in response from printers 4 and 6 (Step S105). Subsequently, information acquisition unit 512 creates apparatus information table 522a (see FIG. 7) including the apparatus information handed over from network communication unit 511, and then stores the table in apparatus registration unit 522 (Step S106).

By the above processing, the apparatus information on all of the other printers which are connected to LAN 1 and are in the power ON state is registered in apparatus information table 522a. When there is a printer that is connected to a power supply system different from that of printers 4 to 6 or there is a printer without a power limiting function, the user operates operation panel 53a to display a list of the printers registered in apparatus information table 522a on LCD 543, and removes such printers from apparatus information table 522a. Moreover, when the time sharing setting is set to OFF even though printers 4 and 6 have the power limiting function, the user similarly removes those printers from apparatus information table 522a and deducts the power consumption thereof from the maximum usable power.

Subsequently, information acquisition unit 512 causes network communication unit 511 to receive, from any one of the printers, e.g. printer 4, the print waiting list (see FIG. 8) and in-use power data indicating the total power consumption of the printers during printing operation (Step S107). Here, a print waiting list and in-use power data are the same data in both of printers 4 and 6. Thereafter, information acquisition unit 512 stores the received print waiting list and in-use power data in data storage unit 523 (Step S108). Next, information acquisition unit 512 hands over the control to print job manager 515, and print job manager 515 starts message reception processing (Step S109). This message reception processing is described in detail later with reference to the flowchart of FIG. 11.

Next, description is given of processing from Step S110 to Step S114 in FIG. 9, which is executed by print job manager 515.

When the power to printer 5 is turned off ("Yes" in Step S110), print job manager 515 stops the message reception processing (Step S114) and terminates the processing. On the other hand, when the power is not turned off ("No" in Step S110), print job manager 515 judges whether or not network communication unit 511 has received a print instruction from external apparatus 2 or 3 (Step S111).

When network communication unit 511 has received a print instruction from external apparatus 2 or 3 ("Yes" in Step S111), print job manager 515 causes network communication unit 511 to receive print data from external apparatus 2 or 3 (Step S112) and stores the received print data in data storage unit 523. Thereafter, print job manager 515 executes a printing processing subroutine shown in detail in FIG. 10 (Step S113). On the other hand, when network communication unit 511 has received no print instruction ("No" in Step S111), print job manager 515 causes the processing to return to Step S110 and repeats Steps S110 and S111 until a print instruction is received.

Next, with reference to the flowchart shown in FIG. 10, a detailed description is given of processing of the printing processing subroutine executed by print job manager 515.

As shown in FIG. 10, print job manager 515 first judges whether or not the value of the time sharing setting stored in setting information storage unit 521 is ON (Step S121). When the value is not ON ("No" in Step S121), print job manager 515 executes normal printing (Step S134) and then causes the processing to return to the main routine.

On the other hand, when the value of time sharing setting is ON ("Yes" in Step S121), print job manager 515 judges whether or not the power usage of its own apparatus during the printing operation, which is read from the nonvolatile memory or the like, is equal to or below the maximum usable power (hereinafter referred to as "allowable value") stored in setting information storage unit 521 (Step S122). When the power usage is higher than the allowable value ("No" in Step S122), print job manager 515 causes network communication unit 511 to transmit a power shortage error notification message to the external apparatus (external apparatus 2 or 3) from which the print instructions have been transmitted (Step S133), and then causes the processing to return to the main routine.

On the other hand, when the power usage of the apparatus is equal to or below the allowable value ("Yes" in Step S122), print job manager 515 causes network communication unit 511 to transmit a print waiting notification message to other printers 4 and 6 (Step S123). Thereafter, print job manager 515 additionally registers the data on its own apparatus (printer 5) at the bottom of print waiting list 523a (Step S124), and waits for its turn for printing ("No" in Step S125).

As described later, when printing of the other printers (printer 4 or 6) registered in print waiting list 523a are started while waiting, the printers having started printing are sequentially removed from print waiting list 523a, and the priorities are updated. Eventually, when the priority of the one printing apparatus is set to "1" and its turn for printing comes ("Yes" in Step S125), print job manager 515 next calculates an expected power used when its own printing apparatus starts printing (Step S126). This expected power is obtained by adding the in-use power stored in data storage unit 523 to the power usage of its own apparatus read from the nonvolatile memory or the like. Thereafter, print job manager 515 judges whether or not the calculated expected power is equal to or below the allowable value (Step S127). When the expected power is higher than the allowable value ("No" in Step S127), print job manager 515 causes the processing to return to Step S126 and repeats Steps S126 and S127 until the in-use power decreases upon completion of printing of the other printer (printer 4 or 6) and the expected power becomes equal to or below the allowable value.

On the other hand, when the expected power is equal to or below the allowable value ("Yes" in Step S127), print job manager 515 causes network communication unit 511 to transmit a print start notification message to other printers 4 and 6 (Step S128), and removes the data on its own apparatus from print waiting list 523a (Step S129). Thereafter, print job manager 515 instructs print data analysis and development unit 513 to execute split printing in which the printing is performed in units of the specified number of sheets. Print data analysis and development unit 513 executes the split printing by handing over to print engine 514 the print data corresponding to the specified number of sheets from the top of the unprinted data stored in data storage unit 523 (Step S130).

When split printing is completed, print job manager 515 causes network communication unit 511 to transmit a print completion notification message to other printers 4 and 6 (Step S131), and causes the processing to return to Step S123. Print job manager 515 repeats the above processing if there are still pages left ("Yes" in Step S132). When there are no more pages left ("No" in Step S132), print job manager 515 causes the processing to return to the main routine.

Next, with reference to FIG. 11, a detailed description is given of the message reception processing. In FIG. 11, print job manager 515 waits for network communication unit 511 to receive a message through LAN 1 ("No" in Step S141). Once network communication unit 511 receives a message ("Yes" in Step S141), print job manager 515 determines the type of the received message (Step S142).

When the type of the received message is a print wait notification ("print wait notification" in Step S142), print job manager 515 additionally registers the printer (printer 4 or 6) as the source of the message in print waiting list 523a (Step S143). Thereafter, print job manager 515 causes the processing to return to Step S141 and waits for a next message to be received. On the other hand, when the type of the received message is a print start notification ("print start notification" in Step S142), print job manager 515 removes the printer (printer 4 or 6) that was the source of the message from print waiting list 523a (Step S144). Thereafter, print job manager 515 overwrites the in-use power stored in data storage unit 523 with a value obtained by adding thereto the power usage of the printer (printer 4 or 6) that was the source of the message, the power usage read from apparatus information table 522a, and stores the obtained value as new in-use power (Step S145). Then, print job manager 515 causes the processing to return to Step S141. On the other hand, when the type of the received message is a print completion notification ("print completion notification" in Step S142), print job manager 515 similarly overwrites the in-use power with a value obtained by subtracting therefrom the power usage of the printer (printer 4 or 6) that was the source of the message, and stores the obtained value as new in-use power (Step S146). Then, print job manager 515 causes the processing to return to Step S141.

Execution of such message reception processing causes printers 4 to 6 to respectively have the print waiting lists with the same content and to detect the in-use power being the total power consumption of the other printers which are in printing operations.

Figure 12:
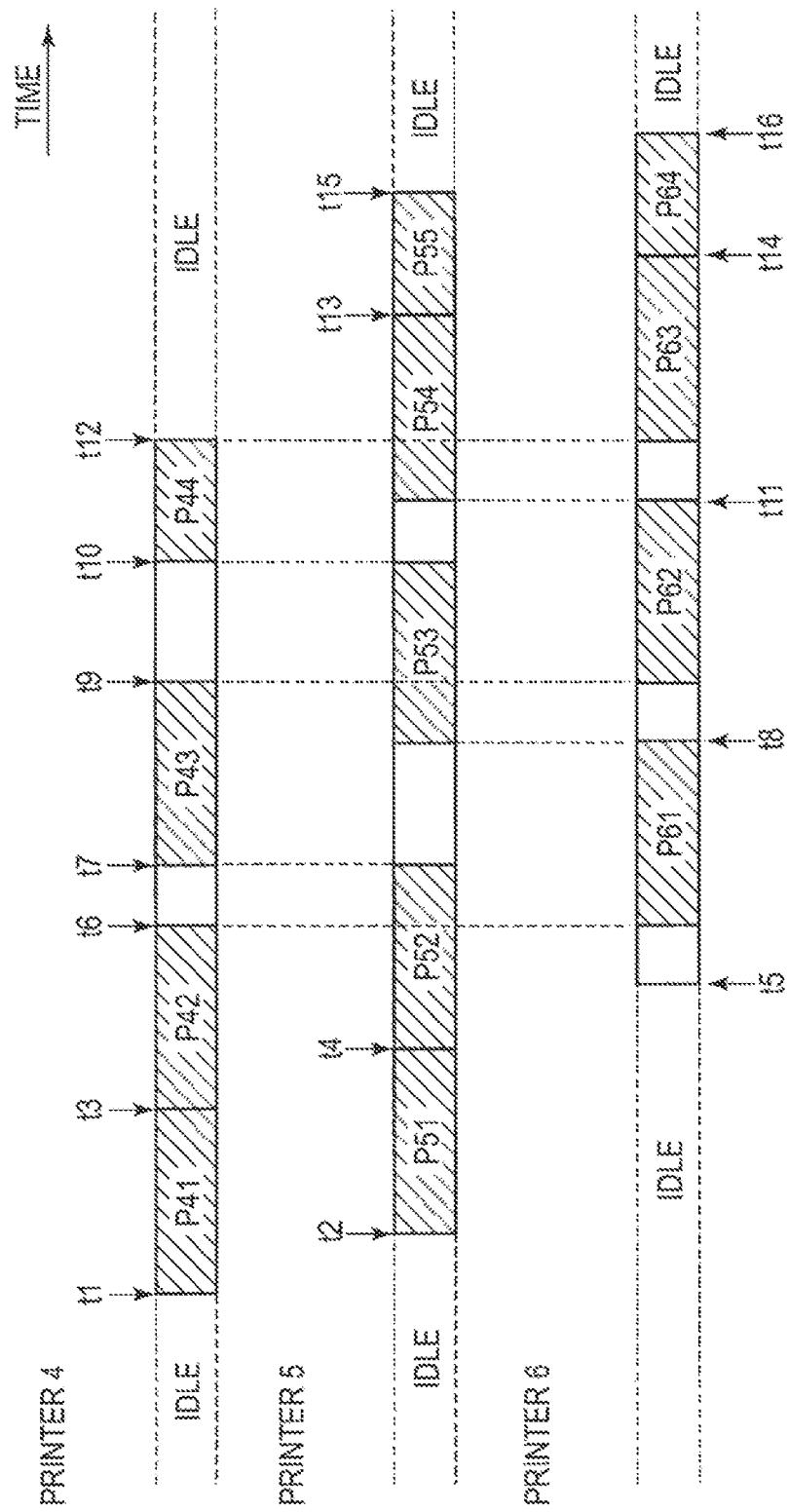
FIG. 12 is a time chart illustrating a print time sharing operation when only up to two out of three printers can simultaneously execute printing operations.

Next, a description is given of an operation example of print time sharing in printing system S1 according to the first embodiment. FIG. 12 is a time chart illustrating a print time sharing operation when it is assumed that three printers 4 to 6 each having a power limiting function are connected to one network and one power supply system, and only up to two out of the three printers can simultaneously execute printing operations due to the power consumption limit of the power supply system.

In FIG. 12, a band graph shows the state transition of each of the printers. Here, the horizontal axis shows the elapsed time. Moreover, in the graph, areas indicated by broken lines represent an idle state, shaded areas represent a state where the split printing is being executed, and blank areas therebetween represent a print wait state. Furthermore, each symbol "Pxy" written in the shaded area represents execution of y-th split printing in printer x.

In this example, three printers 4 to 6 receive print instructions at times t1, t2 and t5, respectively. Between time t1 and time t4, the number of the printers simultaneously receiving the print instructions is two or less. Thus, printers 4 and 5 both start split printing operations without entering the print wait state (P41, P51, P42 and P52). Next, when printer 6 receives the print instruction at time t5, no printer is in the print wait state. Thus, printer 6 calculates an expected power if printer 6 starts printing. Since the calculated value exceeds the allowable value, printer 6 registers itself in the print waiting list and enters the print wait state. Printer 6 waits until the printing operations of the other printers are completed and the in-use power decreases. When split printing P42 at printer 4 is completed at time t6, printer 4 registers itself in the print waiting list and enters the print wait state, since printer 6 has been registered in the print waiting list. As a result, the in-use power is reduced by an amount corresponding to the power usage of printer 4. Thus, printer 6 goes out of the print wait state, and starts a split printing operation (P61).

Next, when split printing of printer 5 is completed at time t7, printer 5 enters the print wait state in turn, and printer 4 starts split printing (P43). Thereafter, three printers 4 to 6 similarly proceed with printing while alternately repeating the print wait state and the split printing state (P53, P62, P44 and P54). When all the printing of printer 4 is completed at time t12, printers 5 and 6 both start to perform split printing sequentially without entering the print wait state (P63, P55 and P64). At time t16, all the printing is completed.

As described above, according to the printing system of the first embodiment, each of the printing apparatuses included in the printing system has the power limiting function, and the printing apparatuses cooperatively control timings of printing operations while communicating with each other. Accordingly, the printing operations are performed so that the total power consumption does not exceed the allowable value. Thus, even when print instructions are simultaneously transmitted to the multiple printing apparatuses, printing can be executed without causing the breaker to trip.

Second Embodiment

Next, in a second embodiment, a description is given of a printing system in which a power limiting function is achieved by a printing control apparatus (print server) of the invention.

Figure 13:
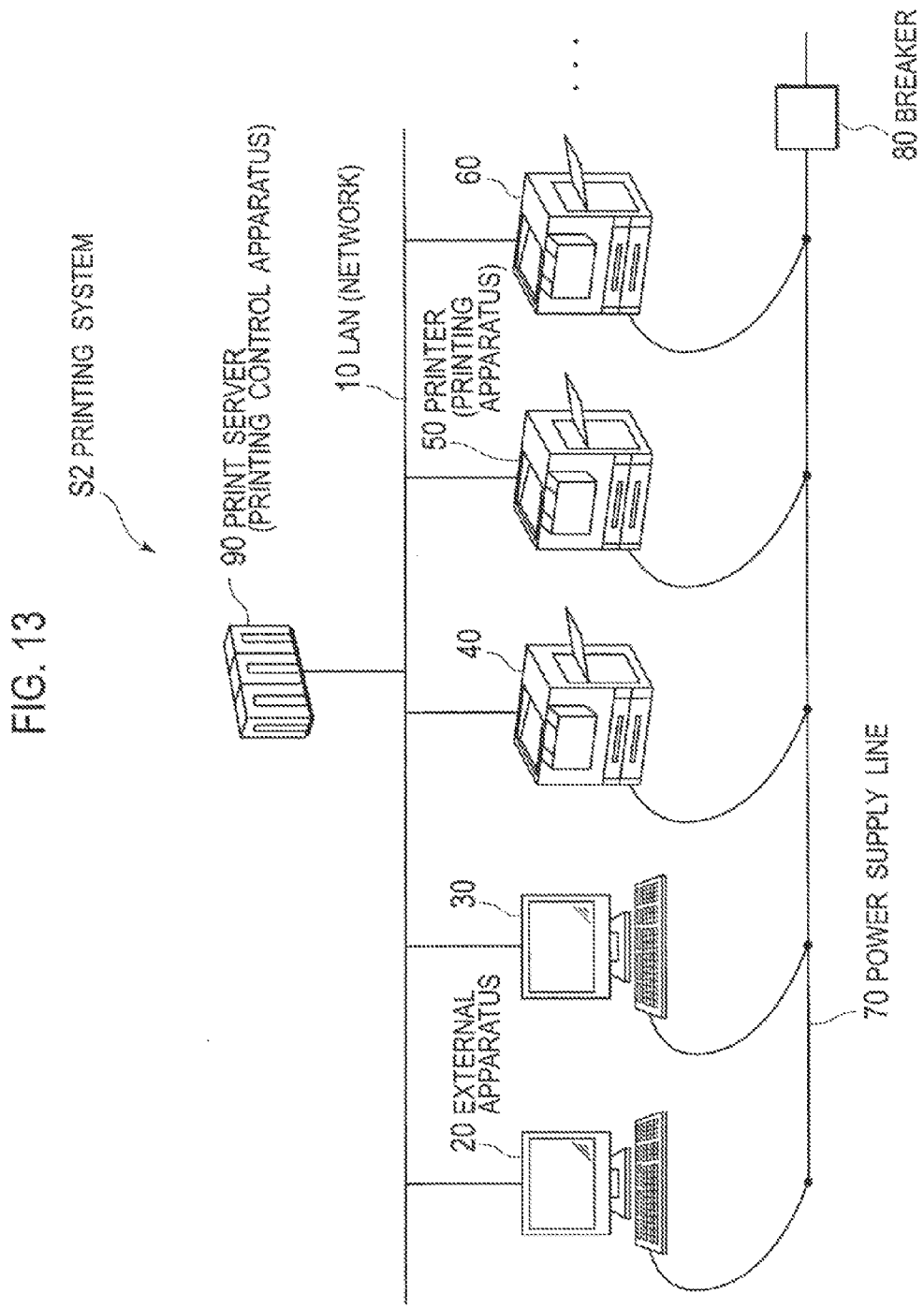
FIG. 13 is a connection configuration diagram illustrating an example of a printing system according to a second embodiment.

FIG. 13 is a connection configuration diagram illustrating an example of the printing system according to the second embodiment. As shown in FIG. 13, printing system 32 includes one or more external apparatuses 20 and 30, one or more printers 40, 50 and 60 as printing apparatuses, and print server 90 being the printing control apparatus of the invention for receiving print instructions transmitted from external apparatuses 20 and 30 and relaying print data to printers 40, 50 and 60. As in the first embodiment, external apparatuses 20 and 30 and printers 40, 50 and 60 are all connected to one LAN 10 and to one power supply line 70 supplied with power via breaker 80.

External apparatuses 20 and 30 have the same configuration as that of external apparatuses 2 and 3 in the first embodiment. However, document print instructions are not directly transmitted to printers 40, 50 and 60 from external apparatuses 20 and 30, but are all transmitted to print server 90. Upon receipt of print data transmitted from print server 90, printers 40, 50 and 60 execute printing operations. In the system, print server 90 has a function of limiting the total power consumption of the entire system. Thus, conventional printing apparatuses having no power limiting function can be used for printers 40, 50 and 60.

FIG. 14 is a functional block diagram illustrating a configuration example of print server 90. As shown in FIG. 14, print server 90 includes controller 91, storage unit 92 and UI unit 93.

Controller 91 includes network communication unit 911, information acquisition unit 912, print data analysis unit 913, print data generator 914, and print job manager 915. These functions are implemented by causing an unillustrated CPU included in print server 90 to load a predetermined program stored in an unillustrated ROM, hard disk drive or the like into an unillustrated RAM and execute the loaded program.

Network communication unit 911 has a function of communicating with external apparatuses 20 and 30 and printers 40, 50 and 60 via LAN 10. Network communication unit 911 receives print data transmitted from external apparatuses 20 and 30 and stores the received print data in data storage unit 923. Network communication unit 911 also transmits the print data to printers 40, 50 and 60 and also transmits and receives various messages in accordance with instructions from information acquisition unit 912 and print job manager 915.

Information acquisition unit 912 as an information acquisition section has a function of acquiring information from UI unit 93 and from printers 40, 50 and 60 through network communication unit 911. Information acquisition unit 912 also has a function of storing the acquired information in setting information storage unit 921, apparatus registration unit 922, and data storage unit 923.

Print data analysis unit 913 has a function of analyzing the print data stored in data storage unit 923 in accordance with an instruction from print job manager 915, and counting the number of sheets to be printed. Print data generator 914 has a function of generating split print data in units of the specified number of sheets from the print data stored in data storage unit 923, and causing network communication unit 911 to transmit the generated data to printers 40, 50 and 60 in accordance with an instruction from print job manager 915.

Print job manager 915 as a print instruction controller has a function of estimating the total power consumption of printers 40, 50 and 60 when causing a print destination printer to start a printing operation upon receipt of print instructions from external apparatuses 20 and 30. Print job manager 915 also has a function of controlling the timing of transmitting the print data to printers 40, 50 and 60 so that the estimated value does not exceed maximum usable power being an allowable value set based on the rated current of breaker 80.

Storage unit 92 and UI unit 93 correspond to storage unit 52 and UI unit 53 in printer 5 according to the first embodiment (see FIG. 2), respectively, and have the same configurations and functions as those of the first embodiment. Thus, descriptions of repetitive portions are omitted and differences from the first embodiment are described below.

In the first embodiment, the power usages acquired from other printers 4 and 6 are stored in apparatus registration unit 522 of printer 5. Meanwhile, in the second embodiment, since printers 40, 50 and 60 have no power limiting function, power usages of the respective printers, which are to be stored in apparatus registration unit 922, need to be additionally set and input using UI unit 93 and the like.

Moreover, in the first embodiment, only the information on other printers 4 and 6 is registered in apparatus registration unit 522 of printer 5. Meanwhile, in the second embodiment, information on all of printers 40, 50 and 60 in operation is registered in apparatus registration unit 922.

Furthermore, in the first embodiment, the print data stored in data storage unit 523 of printer 5 is only the data to be printed by printer 5. Meanwhile, in the second embodiment, print data to be printed by printers 40, 50 and 60 are stored in a mixed state.

FIG. 15 is a block diagram illustrating an internal configuration example of printer 50 without a power limiting function, which is used in printing system S2. Although only printer 50 is described below, printers 40 and 60 also have the same configuration. As shown in FIG. 15, printer 50 includes input unit 501, display unit 502, setting information storage unit 503, data storage unit 504, network communication unit 505, print data analysis and development unit 506, and print engine 507.

Printer 50 shown in FIG. 15 has a configuration obtained by omitting information acquisition unit 512, print job manager 515 and apparatus registration unit 522 from printer 5 of the first embodiment shown in FIG. 2. Moreover, the first to third setting information is not stored in setting information storage unit 503. Since the other constituent elements are the same as those of printer 5, descriptions of repetitive portions are omitted.

Printer 50 has a function of executing a printing operation immediately after receiving print data from print server 90, and, upon completion of the printing, notifying print server 90 to that effect.

FIG. 16 is a diagram illustrating an example of a data structure of a print waiting list stored in data storage unit 923 of storage unit 92.

As shown in FIG. 16, print waiting list 923*a* stores printer names, IP addresses and priorities of printers (in this example, printers 40 and 50) which are in a print wait state and whose unprinted data is held by print server 90. Here, the printers are ones out of all printers 40, 50, 60 connected to LAN 10 and supplied with power from power supply line 7. Note that the printing is performed sequentially from the printer having the priority of "1". When the printing of such printer is started, the printer is removed from print waiting list 923*a* and the priorities of the remaining printers are moved forward by 1, respectively. Moreover, the printer for which print server 90 has received a new print instruction is given a priority following that of the last printer and is added at the bottom of print waiting list 923*a*.

This print waiting list 923*a* is used by print job manager 915 of print server 90 to determine the order of transmission of the print data.

Next, with reference to flowcharts shown in FIGS. 17 and 18, detailed descriptions are given of printing operations in printing system S2 according to the second embodiment. Note that it is assumed that the first to third setting information input using UI unit 93 has already been stored in setting information storage unit 921 of print server 90, and that time sharing setting is set to ON.

FIG. 17 is a flowchart illustrating processing during a print time sharing operation performed by print server 90 included in printing system S2 according to the second embodiment. In FIG. 17, processing from Step S201 to Step S205 is executed when print server 90 is turned on.

When print server 90 is turned on, information acquisition unit 912 first acquires information on printers connected to LAN 10 by executing processing from Step S201 to Step S203.

Specifically, information acquisition unit 912 causes network communication unit 911 to execute broadcast transmission in which a broadcast signal is transmitted to LAN 10 (Step S201) and to receive IP addresses transmitted in response from printers 40, 50, 60, (Step S202). Thereafter, information acquisition unit 912 causes network communication unit 911 to transmit a message requesting for apparatus information to printers 40, 50, 60, . . . which have transmitted the IP addresses in response, and then to receive the apparatus information transmitted in response from printers 40, 50 and 60 (Step S203).

Subsequently, information acquisition unit 912 creates apparatus information table (having the same contents as those of table 522*a* in FIG. 7) from the apparatus information handed over from network communication unit 911 and the power usages of the respective printers, which have been separately set and input using UI unit 93 and the like, and then stores the table in apparatus registration unit 922 (Step S204).

By the above processing, the apparatus information on all the printers which are connected to LAN 10 and are in the power ON state is stored in apparatus registration unit 922. As in the case of the first embodiment, printers connected to a power supply system different from that of printers 40, 50 and 60 are removed from the apparatus information table.

Next, information acquisition unit 912 hands over the control to print job manager 915, and print job manager 915 initializes print waiting list 923*a* and the in-use power stored in data storage unit 923 (Step S205).

Next, a description is given of processing from Step S206 to Step S209 in FIG. 17, which is executed by print job manager 915.

When the power to print server 90 is turned off ("Yes" in Step S206), print job manager 915 terminates the processing. On the other hand, when the power is not turned off ("No" in Step S206), print job manager 915 judges whether or not network communication unit 911 has received a print instruction from external apparatus 20 and 30 (Step S207).

When network communication unit 911 has received a print instruction from external apparatus 20 or 30 ("Yes" in Step S207), print job manager 915 causes network communication unit 911 to receive print data from external apparatus 20 or 30 (Step S208) and stores the received print data in data storage unit 923. Thereafter, print job manager 915 starts a print task shown in detail in FIG. 18 (Step S209) and causes the processing to return to Step S206. On the other hand, when network communication unit 911 has received no print instruction ("No" in Step S207), print job manager 915 causes the processing to return to Step S206 and repeats Steps S206 and S207 until a print instruction is received. Thus, every time print server 90 receives the print instruction, a print task corresponding to the instructed print destination printer is started. Note that when the print instructions are continuously received, multiple print tasks are simultaneously generated. However, when multiple print tasks are simultaneously generated for one printer, control needs to be performed to execute only the first generated task.

Next, with reference to the flowchart shown in FIG. 18, a detailed description is given of processing of the print task started in Step S209 of FIG. 17.

In the print task shown in FIG. 18, print job manager 915 first determines whether or not the power usage of the print destination apparatus (any of printers 40 to 60), which is read from apparatus registration unit 922, is equal to or below the allowable value stored in setting information storage unit 921 (Step S221). When the power usage is higher than the allowable value ("No" in Step S221), print job manager 915 causes network communication unit 911 to transmit a power shortage error notification message to the external apparatus (external apparatus 20 or 30) from which the print instructions have been transmitted (Step S232), and then terminates the processing.

On the other hand, when the power usage of the print destination apparatus is equal to or below the allowable value ("Yes" in Step S221), print job manager 915 additionally registers the data on the print destination apparatus at the bottom of print waiting list 923a (Step S222), and waits for its turn for printing ("No" in Step S223).

Meanwhile, when printing of the other printers registered in print waiting list 923a are started while waiting, the printers having started printing are sequentially removed from print waiting list 923a in the print task of the printing. Eventually, when the priority of the print destination apparatus is set to "1" and its turn for printing comes ("Yes" in Step S223), print job manager 915 next calculates an expected power used when the print destination apparatus starts printing (Step S224). This expected power is obtained by adding the in-use power stored in data storage unit 923 to the power usage of the print destination apparatus read from apparatus registration unit 922. Thereafter, print job manager 915 judges whether or not the calculated expected power is equal to or below the allowable value (Step S225). When the expected power is higher than the allowable value ("No" in Step S225), print job manager 915 causes the processing to return to Step S224 and repeats Steps S224 and S225 until the in-use power decreases upon completion of printing of the other printer and the expected power becomes equal to or below the allowable value.

On the other hand, when the expected power is equal to or below the allowable value ("Yes" in Step S225), print job manager 915 adds the power usage of the print destination apparatus to the in-use power (Step S226), and removes the data on the print destination apparatus from print waiting list 923a (Step S227). Thereafter, print job manager 915 instructs print data generator 914 to generate and transmit print data corresponding to a single unit of a specified number of sheets (Step S228) and waits for the printing to be completed ("No" in Step S229). Print data generator 914 hands over to network communication unit 911 split print data generated by extracting the print data corresponding to the specified number of sheets from the top of the unprinted data on the print destination apparatus, the unprinted data stored in data storage unit 923. Then, print data generator 914 causes network communication unit 911 to transmit the split print data to the print destination apparatus.

The print destination apparatus (any of printers 40 to 60) starts printing immediately upon receiving the split print data, and transmits a print completion notification message when the printing is completed. Upon receipt of a notification notifying that the print completion notification message has been received from network communication unit 911 ("Yes" in Step S229), print job manager 915 subtracts the power usage of the print destination apparatus from the in-use power (Step S230). Thereafter, print job manager 915 causes the processing to return to Step S222 and repeat the above processing if there are pages left to be printed in the print destination apparatus ("Yes" in Step S231). When there are no more pages left ("No" in Step S231), print job manager 915 terminates the processing.

As described above, in the printing system according to the second embodiment, the printing control apparatus (print server) collectively manages the timing of printing operations of all the printing apparatuses. Thus, the printing system according to the second embodiment can achieve the same print time sharing operation as that in the printing system according to the first embodiment even when the printing apparatuses having no power limiting function are used.

It should be understood that the first and second embodiments disclose a print management method including steps of: calculating a sum of power usages of the printing apparatuses that are expected to be concurrently in printing operations; and regulating the printing operation of at least one of the printing apparatus when the calculated sum exceeds the predetermined allowable value. Note that the invention includes embodiments other than the first and second embodiments, that executes the above print management method.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

What is claimed is:

1. A printing apparatus to be connected to a network, the printing apparatus configured to receive a print instruction with print data from one or more external apparatuses and to execute printing in accordance with the print data, the printing apparatus comprising:
   a storage unit configured to store a power usage of each of other printing apparatuses during a printing operation, the other printing apparatuses being connected to a power supply system to which the printing apparatus is connected; and
   a print execution controller configured to:
      keep track of which of the other printing apparatuses are in printing operation, by receiving messages indicating start and end of the printing operations from the other printing apparatuses;
      calculate a total of power usages of the other printing apparatuses in printing operation by referring to the power usages stored in the storage unit upon receipt of the print data from any of the external apparatuses;
      inhibit the printing apparatus from executing the printing operation when an expected power exceeds a predetermined allowable power value, the expected power being calculated as a sum of the calculated total of the power usages of the other printing apparatuses and the power usage of the printing apparatus during the printing operation; and
      allow the printing apparatus to execute the printing operation when the expected power is equal to or below the predetermined allowable power value;
   wherein the print execution controller is further configured such that if the print execution controller allows the printing apparatus to execute the printing operation and if the received print data exceeds a predetermined allowable data amount, the printing operation is executed in a split printing mode on a unit-by-unit basis.

2. The printing apparatus according to claim 1, further comprising:
a print engine configured to print the print data in accordance with the print instruction from the external apparatuses.

3. The printing apparatus according to claim 1, further comprising:
an information acquisition unit configured to acquire the power usage during the printing operation from the other printing apparatus through the network at start-up of the printing apparatus.

4. The printing apparatus according to claim 1, wherein
the predetermined allowable power value is set based on a rated current of a breaker installed in the power supply system.

5. A printing system comprising:
one or more printing apparatuses according to claim 1 belonging to one power supply system; and
one or more external apparatuses configured to transmit a print instruction to any of the printing apparatuses, the printing apparatuses and the external apparatuses being connected to each other via a network.

6. The printing apparatus according to claim 1, wherein
the print execution controller is configured such that if the print execution controller allows the printing apparatus to execute the printing operation and if the received print data corresponds to a number of printed sheets that exceeds a predetermined allowable number of sheets, the printing operation is executed in a split printing mode on a unit-by-unit basis, with units being equal to the predetermined allowable number of sheets.

7. The printing apparatus according to claim 6, further comprising:
a user interface unit configured to permit a user to set and input at least one of the predetermined allowable power value and the predetermined allowable number of sheets.

8. The printing apparatus according to claim 1, wherein
the storage unit is configured to store therein a print waiting list defining priority among one or more printing apparatuses that is/are in a print wait state having unprinted print data therein; and
the print execution controller is configured to execute the print operation in order of the priority.

9. The printing apparatus according to claim 8, wherein
the print execution controller is configured such that, when it receives the print date from any of the external apparatuses and the expected power does not exceed the predetermined allowable power value, the print execution controller adds the printing apparatus to the print waiting list.

10. The printing apparatus according to claim 8, wherein
the print execution controller is configured such that, upon start of printing the received print data, the print execution controller deletes the printing apparatus from the print wait list.

11. A printing control apparatus connected to a network, the printing control apparatus configured to receive a print instruction with print data from external apparatuses and to transmit the print data to one of a plurality of printing apparatuses belonging to one power supply system in order to cause said one printing apparatus to print sheets in accordance with the print data, the printing control apparatus comprising:
a storage unit configured to store a power usage of each of the printing apparatuses during a printing operation; and
a print instruction controller configured to, upon receipt of the print data to any one of the printing apparatuses, adjust a timing of transmitting the print data to the printing apparatus by referring to the power usage stored in the storage unit so that a sum of power usages of printing apparatuses expected to be concurrently in printing operations does not exceed a predetermined allowable power value;
wherein the print instruction controller is configured such that if the received print data exceeds a predetermined allowable data amount, the print instruction controller splits the print data into units and transmits the print data to the printing apparatus on a unit-by-unit basis.

12. The printing control apparatus according to claim 11, further comprising:
a communication unit configured, in accordance with the print instruction from the external apparatuses, to transmit the print data to one of the printing apparatuses in order to cause the one of the printing apparatuses to print the print data.

13. The printing control apparatus according to claim 11, wherein
the predetermined allowable power value is set based on a rated current of a breaker installed in the power supply system.

14. A printing system comprising:
the printing control apparatus according to claim 11;
one or more printing apparatuses connected to one power supply system and configured to execute printing when receiving print data transmitted from the printing control apparatus; and
one or more external apparatuses configured to give the printing control apparatus a print instruction for each of the printing apparatuses,
wherein the printing control apparatus, the printing apparatuses, and the external apparatuses are connected to each other via a network.

15. The printing control apparatus according to claim 11, wherein
the print instruction controller is configured such that if the received print data corresponds to a number of printed sheets that exceeds a predetermined allowable number of sheets, printing is executed in a split mode on a unit-by-unit basis, with units being equal to the predetermined allowable number of sheets.

16. A print control method used for a print system wherein printing apparatus are connected to a host apparatus via a network, comprising:
calculating a sum of power usages of the printing apparatuses that are expected to be concurrently in printing operations;
determining whether the calculated sum exceeds a predetermined allowable power value; and
regulating the printing operation of at least one of the printing apparatuses when the calculated sum exceeds the predetermined allowable power value;
wherein said regulating comprises inhibiting said at least one of the printing apparatuses from executing its printing operation when the calculated sum exceeds the predetermined allowable power value and allowing said at least one of the printing apparatuses to execute its printing operation when the calculated sum is equal to or below the predetermined allowable power value; and
wherein said regulating further comprises causing said at least one of the printing apparatuses to execute its printing operation in a split printing mode, on a unit-by-unit basis, if received print data exceeds a predetermined allowable data amount.

* * * * *